US006858172B2

(12) United States Patent
Daharsh et al.

(10) Patent No.: US 6,858,172 B2
(45) Date of Patent: Feb. 22, 2005

(54) CURRENT SENSOR SUPPORTING STRUCTURE

(75) Inventors: Ross S. Daharsh, South Milwaukee, WI (US); Daniel Schreiber, New Berlin, WI (US); Paul N. Stoving, South Milwaukee, WI (US); Dan G. Marginean, Racine, WI (US)

(73) Assignee: Cooper Industries, Inc., Houston, TX (US)

( * ) Notice: Subject to any disclaimer, the term of this patent is extended or adjusted under 35 U.S.C. 154(b) by 0 days.

(21) Appl. No.: 10/819,997

(22) Filed: Apr. 8, 2004

(65) Prior Publication Data

US 2004/0190212 A1 Sep. 30, 2004

Related U.S. Application Data

(62) Division of application No. 09/809,012, filed on Mar. 16, 2001, now Pat. No. 6,760,206.

(51) Int. Cl.[7] .......... B29C 39/00
(52) U.S. Cl. .......... 264/272.14
(58) Field of Search .......... 361/93.1, 92, 42, 361/45; 29/592.1, 622; 264/272.13, 272.14

(56) References Cited

U.S. PATENT DOCUMENTS 3,223,890 A 12/1965 Maul et al.
3,562,457 A 2/1971 Peek
3,668,513 A 6/1972 Tsubouchi et al.
3,725,741 A 4/1973 Misencik
3,921,113 A 11/1975 Schiemann
3,943,433 A 3/1976 Hermstein et al.
4,271,463 A 6/1981 Tanimura et al.
4,320,372 A 3/1982 Thuries et al.
4,510,477 A 4/1985 Rostron et al.
4,701,738 A 10/1987 Preissinger et al.
4,808,910 A 2/1989 Kessi
5,162,726 A * 11/1992 Swanson et al. .......... 324/127
5,225,803 A 7/1993 Negle et al.
5,268,642 A 12/1993 Uchidomi
5,585,611 A 12/1996 Harvey et al. .......... 218/155
5,917,316 A 6/1999 Bosco et al.
6,014,072 A 1/2000 Gimeno et al.

OTHER PUBLICATIONS

Cooper Power Systems, Kyle Type SyncCap Power Quality Switch (7 pages).
Cooper Power Systems, The Kyle Nova Switch, Jun. 1998 (11 pages).
Cooper Power Systems, Kyle Type VCS–3 Vacuum Capacitor Switch, Apr. 2000 (2 pages).
Cooper Power Systems, Switches, http://www.cooperpower.com/Products/Distribution/Switches/, 2000 (1 page).
Cooper Power Systems, Vacuum–Break Switches, Mar. 2000, USA (16 pages).
Cooper Power Systems, Oil and Vacuum–Break Switches, Jan. 1990, USA (19 pages).
Cooper Power Systems, VCS–3 Vacuum Capacitor Switch Features and Benefits, http://www.cooperpower.com/Products/Distribution/Switches/features.asp, 2000 (1 page).

* cited by examiner

*Primary Examiner*—Brian Sircus
*Assistant Examiner*—Boris Benenson
(74) *Attorney, Agent, or Firm*—Fish & Richardson P.C.

(57) ABSTRACT

An electrical switchgear device includes a conductor, a base, and a current sensor positioned to detect current in the conductor and attached to the base using a support element. The device also includes an apparatus mounted to the base to interrupt current through the conductor when a signal from the current sensor indicates a predetermined condition. A housing positioned on the base encapsulates the current sensor, the support element, the current interrupting apparatus, and a portion of the conductor.

9 Claims, 13 Drawing Sheets

CURRENT SENSOR SUPPORTING STRUCTURE

CROSS REFERENCE TO RELATED APPLICATION

This application is a divisional (and claims the benefit of priority 35 USC 120) of U.S. application Ser. No. 09/809,012, filed Mar. 16, 2001 now U.S. Pat. No. 6,760,206. The disclosure of the prior application is considered part of (and is incorporated by reference in) the disclosure of this application.

TECHNICAL FIELD

This invention relates to current sensors used in electrical switchgear.

BACKGROUND

Current sensors are used in the electric power industry to measure current flowing in electrical systems. In particular, current sensors may be used in electrical switchgear such as circuit breakers, reclosers, and switches to determine when a fault has occurred in the electrical system.

SUMMARY

In one general aspect, an electrical switchgear device includes a conductor, a base, and a current sensor positioned to detect current in the conductor and attached to the base using a support element. The device also includes an apparatus mounted to the base to interrupt current through the conductor when a signal from the current sensor indicates a predetermined condition. A housing positioned on the base encapsulates the current sensor, the support element, the current interrupting apparatus, and the conductor.

Embodiments may include one or more of the following features. The housing may include a solid insulating material. The support element may include a rigid tube. The support element may be bent at an end coupled to the current sensor. The bent end of the support element may include a support strip shaped to match a curvature of the current sensor.

The current sensor may include a sensor conductor that produces a signal. The support element may be hollow—in this case, the sensor conductor is drawn through the support element to control circuitry. The sensor conductor and the support element may be hermetically sealed. The support element may be hermetically sealed to the base.

The support element may be metallic or non-metallic. In either case, the support element may be coated with a semi-conductive paint.

The housing may encapsulate the current sensor, the support element, the current interrupting apparatus, and the conductor such that there is no dielectric interface between the current sensor and the conductor.

In another general aspect, a method of producing an electrical switchgear device includes securing a support element to a current sensor. The current sensor is mounted relative to a main conductor by securing the support element to a surface of a mold that houses a current interrupter and a portion of the conductor. A prepared material is injected into the mold to encapsulate the support element, the current sensor, the conductor, and the current interrupter. The injected material is permitted to solidify to form a housing.

Embodiments may include one or more of the following features. The support element may be secured to the current sensor by drawing sensor conductors from the current sensor through a hollow passage of the support element. The support element may be secured to the current sensor by bending a first end of the support element and attaching to the first end a support strip shaped to match a curvature of the current sensor. The support element may be secured to the current sensor by securing the support strip to the current sensor.

The support element may be secured to the surface of the mold by connecting a second end of the support element to a post positioned at the surface of the mold. The second end of the support element may be connected to the post by hermetically sealing the second end to the post. The second end of the support element may be connected to the post by drawing sensor conductors from the current sensor through a hollow passage of the post. The method may include removing the mold from the housing and securing the housing to a tank that houses additional components.

The electrical switchgear exhibits improved overall dielectric performance because all of the components are encased into a single housing with no dielectric interfaces. Moreover, the electrical switchgear exhibits a longer life because of reduced failure associated with dielectric breakdown at interfaces. Manufacturing of the electrical switchgear is more economical due to simplification of the current sensor design.

The details of one or more embodiments of the invention are set forth in the accompanying drawings and the description below. Other features and advantages will be apparent from the description, the drawings, and the claims.

DESCRIPTION OF DRAWINGS

Like reference symbols in the various drawings indicate like elements.

DETAILED DESCRIPTION

The invention provides improved techniques for supporting a current sensor in electrical switchgear. For ease of explaining the improved technique, electrical switchgear constructed according to a current technique are discussed relative to FIGS. 1–4, prior current sensor mounting systems are discussed relative to FIGS. 7–9, and electrical switchgear constructed according to the improved technique is discussed relative to FIGS. 5, 6, and 10–13.

Figure 1:
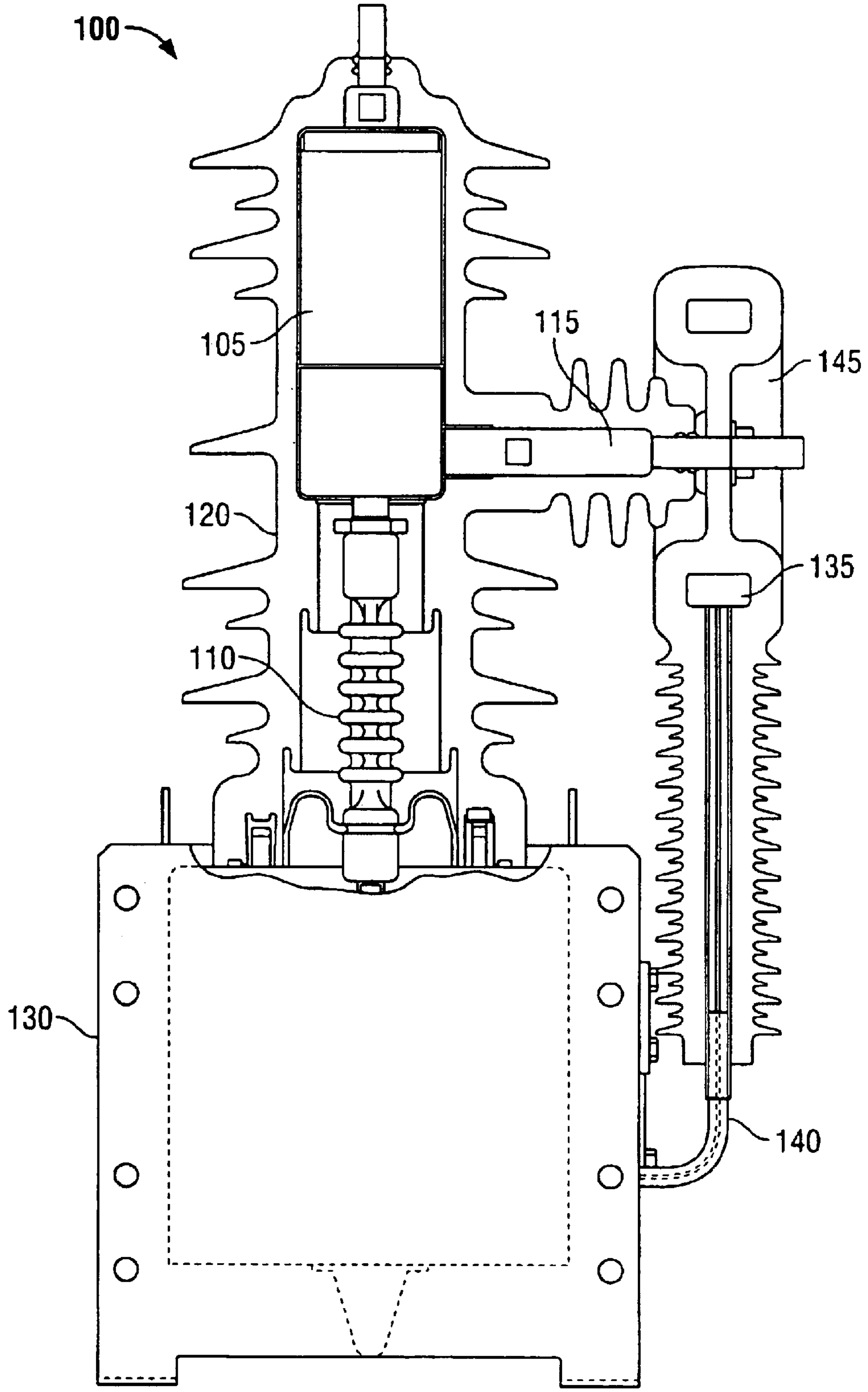
FIG. 1 (Background Art)
FIG. 1 is a cross section of an electrical switchgear with an exemplary mounting device for a current sensor.
Figure 2:
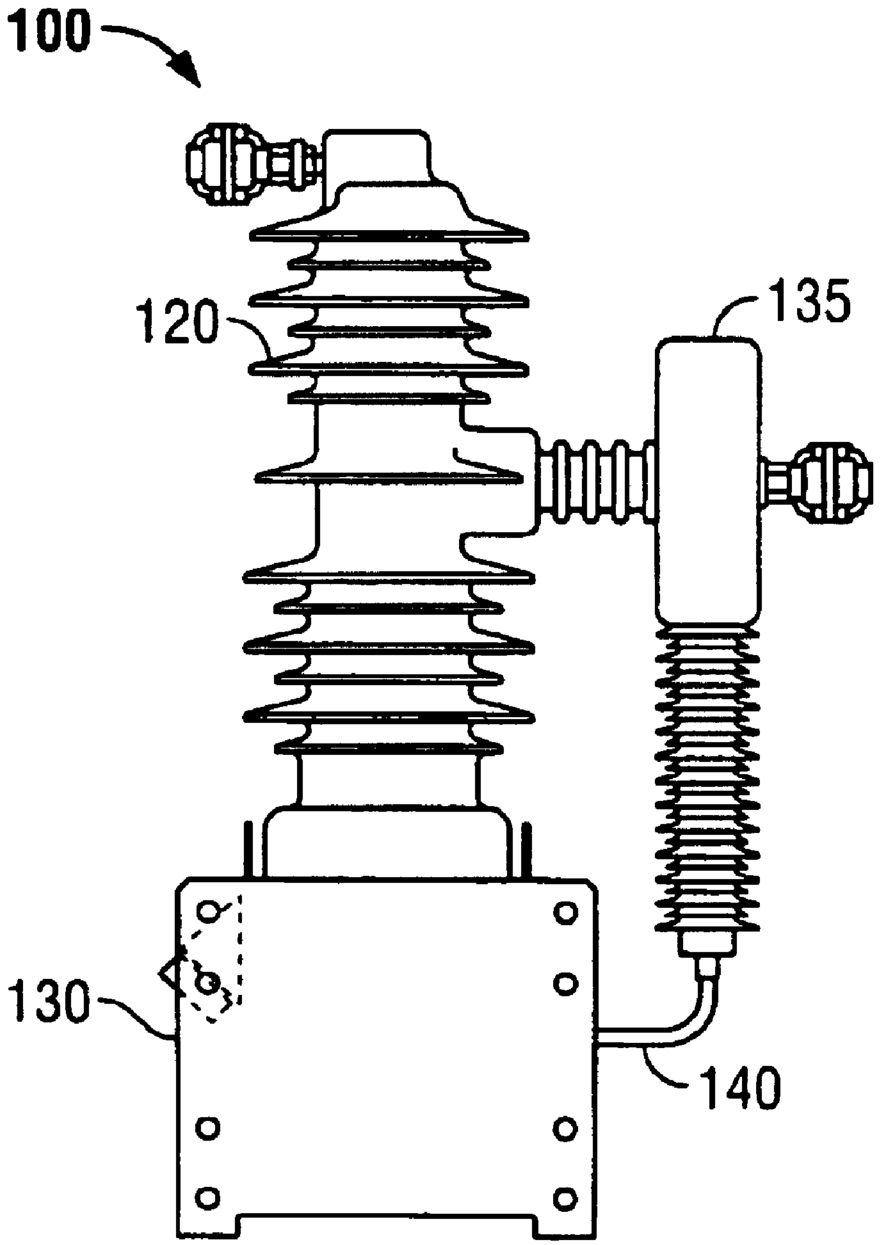
FIG. 2 (Background Art)
FIG. 2 is a side view of a three-phase electrical switchgear of FIG. 1.

Referring to FIGS. 1 and 2, electrical switchgear 100 includes a current interrupter 105, an insulated operating rod 110, and a conductor 115 encapsulated in a solid polymer that makes up a housing 120. The housing 120 is mounted on a tank or base 130 that houses additional components. For example, in electrical switchgear 100, the tank 130 typically houses an electromagnetic actuator mechanism, a latching mechanism, and a motion control circuit.

The housing 120 is manufactured of a solid polymer such as an epoxy or other solid insulating material. Solid dielectric insulation eliminates the need for insulating gas or liquid, thereby greatly reducing switch life-cycle maintenance costs. The solid dielectric insulation may be made of a cycloaliphatic epoxy component and an anhydride hardener, mixed with silica flour filler.

A current sensor 135 is mounted externally to the housing 120 and is partially supported by a coupler 140 attached to the tank 130. The current sensor 135 measures direction and magnitude of current flowing though the conductor 115 based on the principle of induction. The current sensor 135 is typically formed from a conductor wound around a magnetic core. In this way, alternating current through the conductor 115 induces a current through the conductor in the current sensor 135. Wires from the current sensor 135 are directed through the coupler 140 and into the tank 130 to the appropriate control or relay circuitry. Before mounting, the current sensor 135 is also encased in a housing 145 using a solid polymer.

Figure 3:
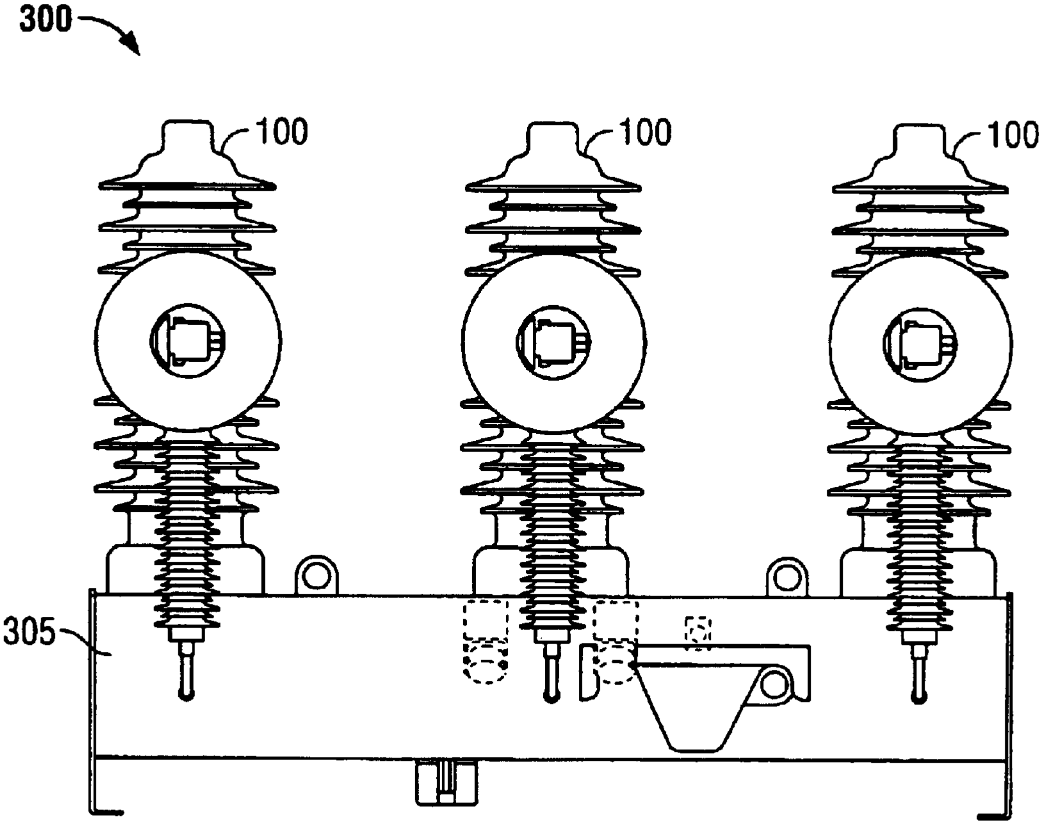
FIG. 3 (Background Art)
FIG. 3 is a front view of the three-phase electrical switchgear of FIG. 2.

Referring also to FIG. 3, the electrical switchgear 100 may be implemented in a three-phase electrical switchgear power system 300. In this case, electrical switchgear 100 is used for each phase of the power system. The three electrical switchgear 100 are mounted on a tank 305 that is designed like tank 130 to hold the additional components.

Figure 4:
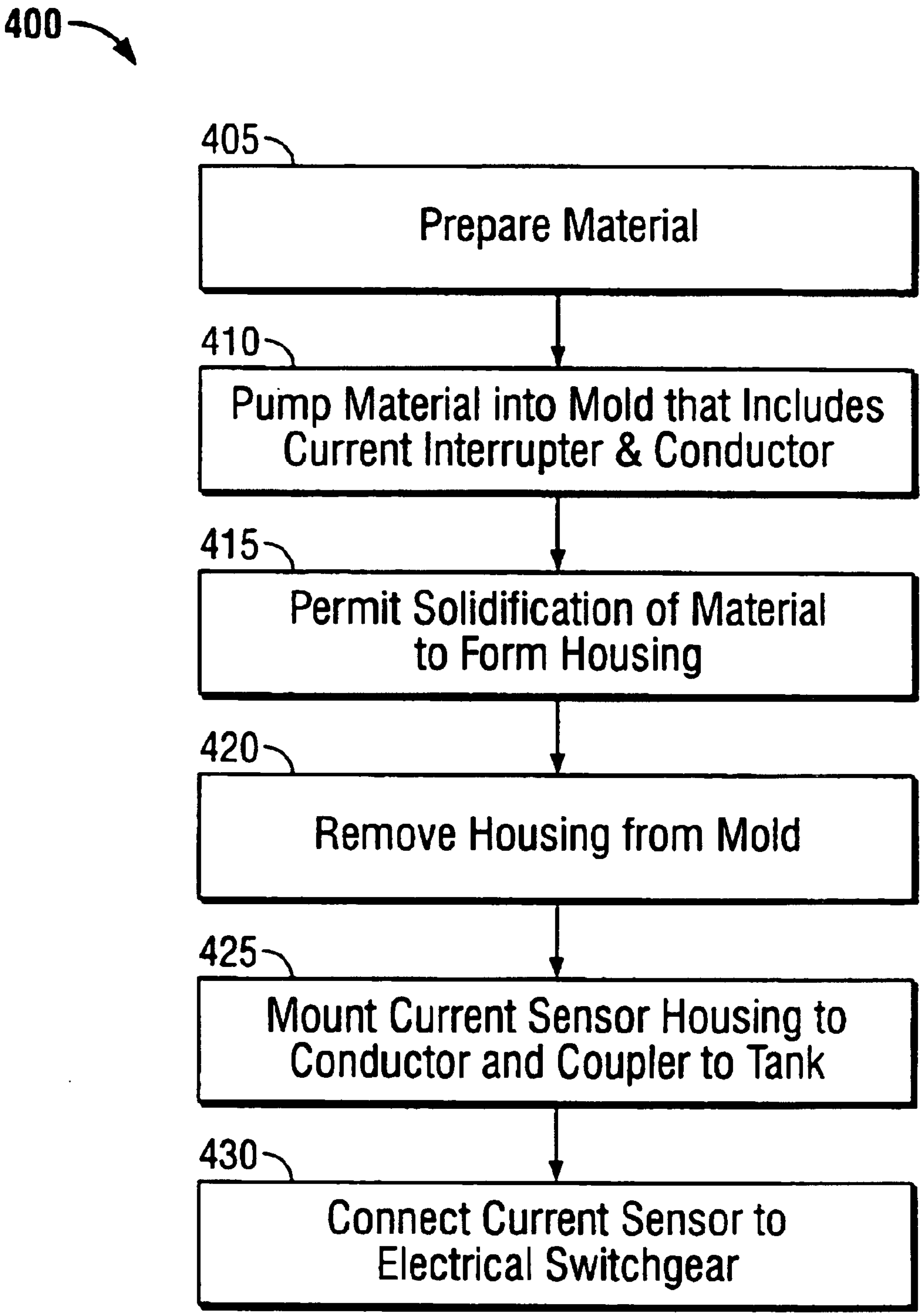
FIG. 4 is a flowchart of a procedure for forming a housing of the electrical switchgear of FIGS. 1–3.

Referring also to FIG. 4, the housing 120 may be formed using a procedure 400 for casting. In one implementation, the procedure 400 is an automatic pressure gelation (APG) procedure. Initially, cycloaliphatic epoxy material is prepared, for example, by preheating and degassing in special equipment provided with vacuum (step 405). The mold houses the current interrupter 105 and conductor 115, as shown in FIG. 1. Then, the preheated and degassed material is pumped under pressure into the mold at a higher temperature, which provides the necessary energy to disrupt the equilibrium of the system to start gelation and crosslinking processes in the material(step 410). When the desired crosslinking and gelation of the material is completed, an encapsulation or housing 120 is formed (step 415) and then removed from the mold (step 420). The gelation and crosslinking processes provide a housing 120 with a desired glass transition temperature, which enhances its dielectric and mechanical properties and enhances its ultraviolet protection and weather resistance. Alternatively, the housing 120 may be molded by other procedures, for example, vacuum casting.

After the housing is removed from the mold (step 420), the current sensor housing 145 (which contains the current sensor 135) is mounted to the conductor 115 portion that extends from the housing 120 and the coupler 140 is mounted to the tank 130 (step 425). The current sensor housing 145 may be formed using a procedure similar to procedure 400. The current sensor 135 is then connected to appropriate control or relay circuitry associated with the electrical switchgear (step 430).

Figure 5:
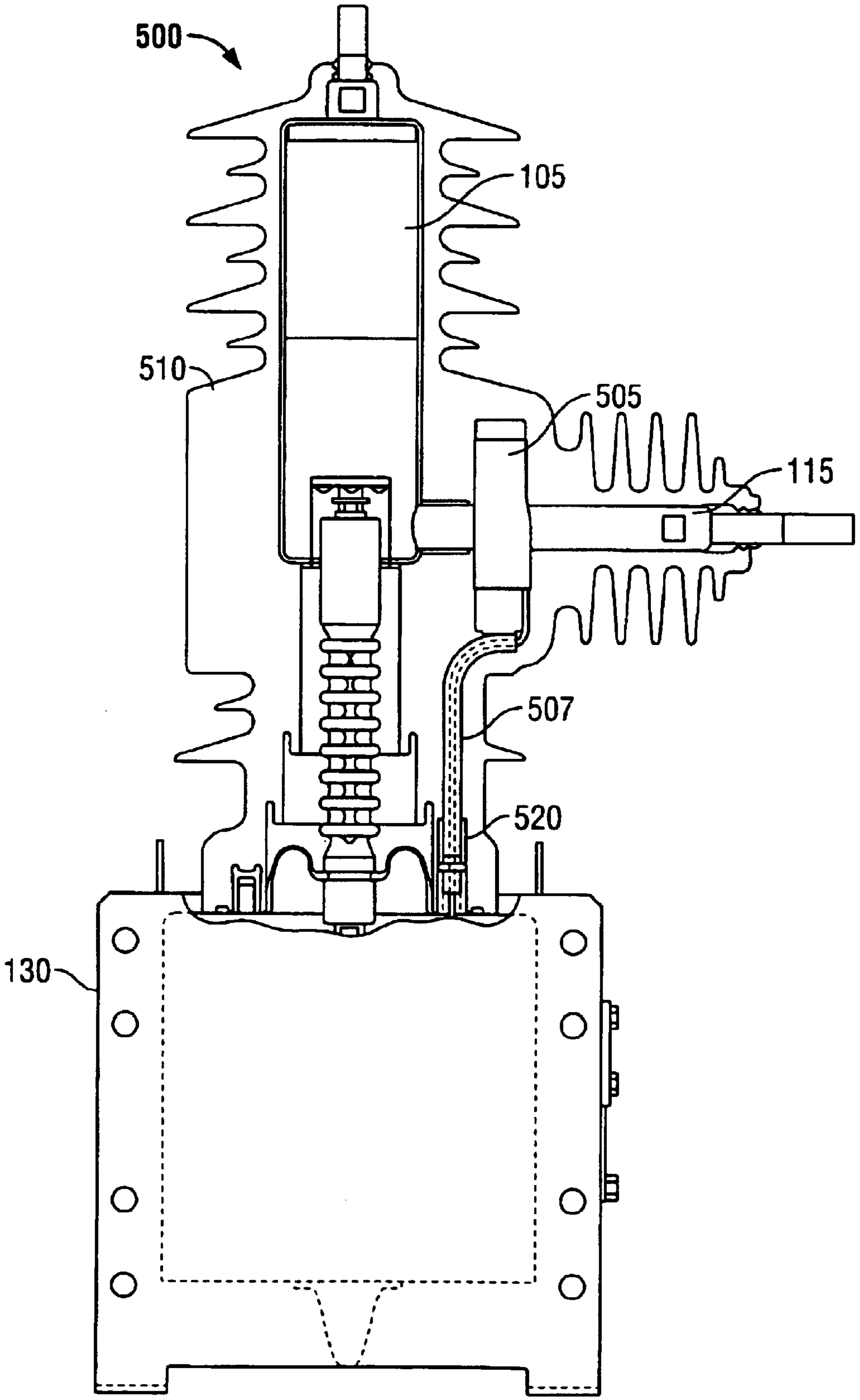
FIG. 5 is a cross section of an electrical switchgear that includes an improved current sensor mounting system.
Figure 6:
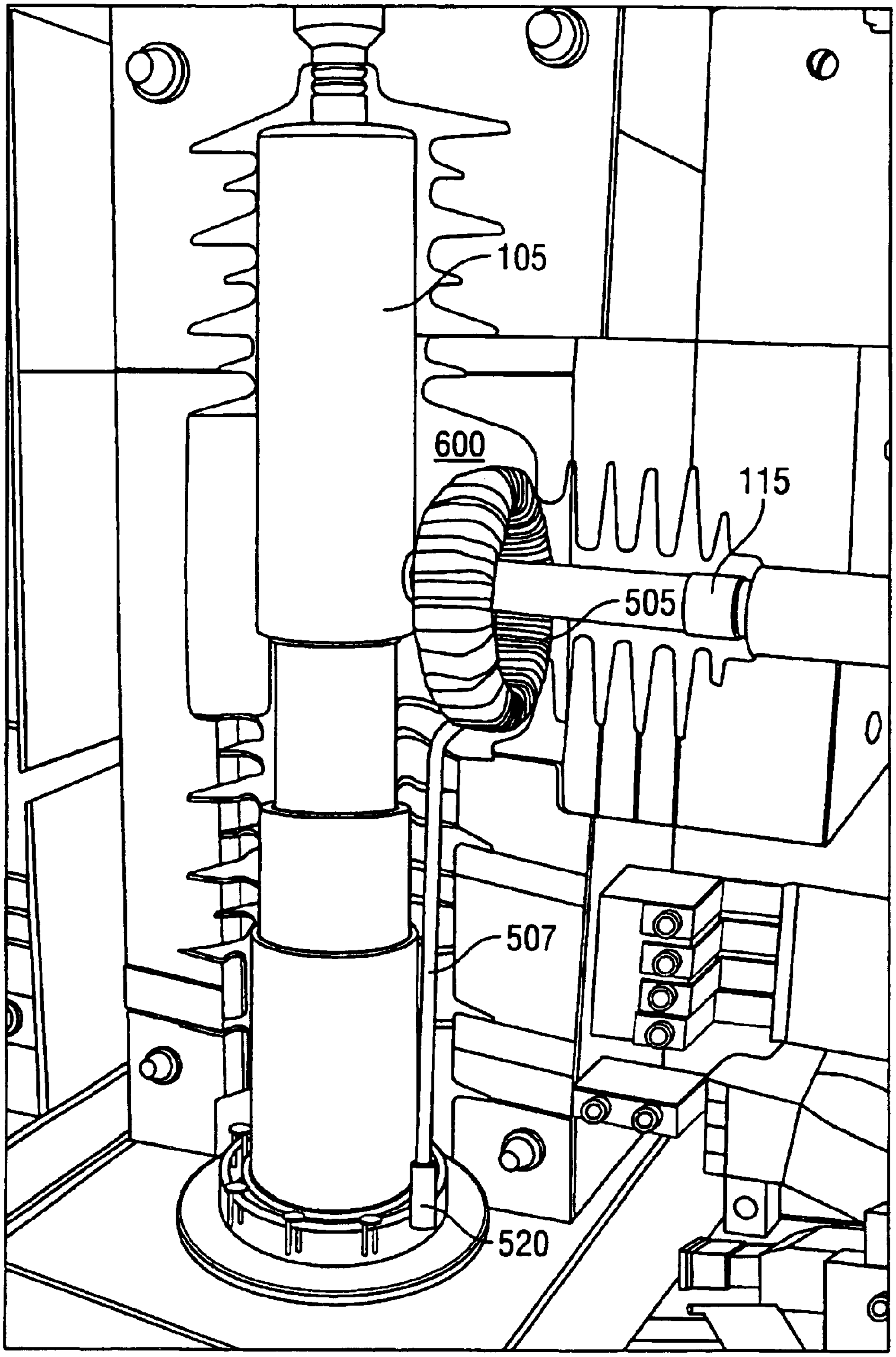
FIG. 6 is a perspective view of a mold used in forming the electrical switchgear of FIG. 8.

Referring to FIGS. 5 and 6, electrical switchgear 500 is similar in design and operation to electrical switchgear 100 in many respects. The switchgear differ primarily with respect to the positioning, design, and manufacture of current sensor 505. In electrical switchgear 500, the current sensor 505 is mounted relative to conductor 115 prior to molding of the current sensor 505 or the conductor 115.

Figure 7:
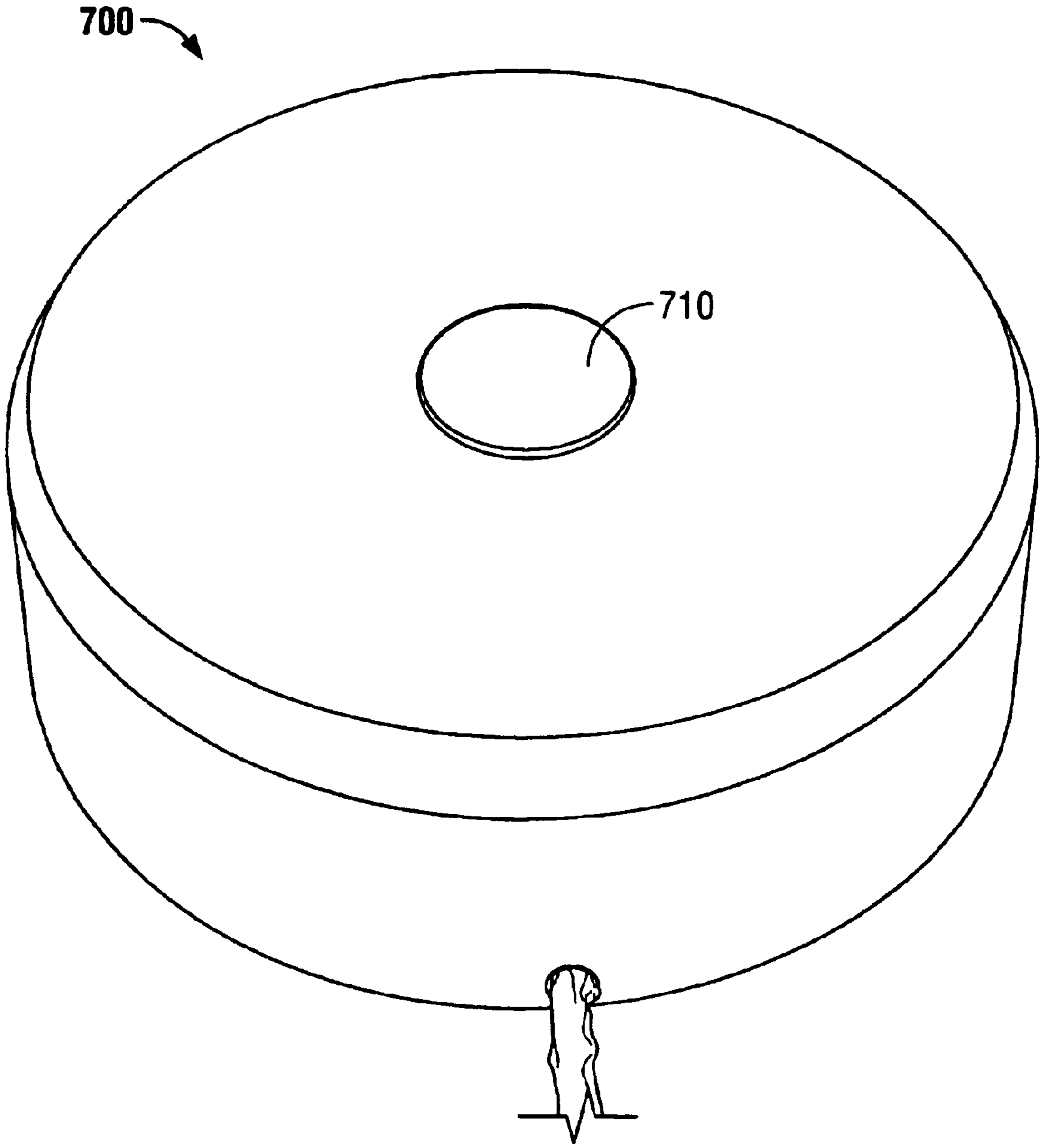
FIGS. 7–9 are perspective views of alternative mounting devices for current sensors used with electrical switchgear.
Figure 8:
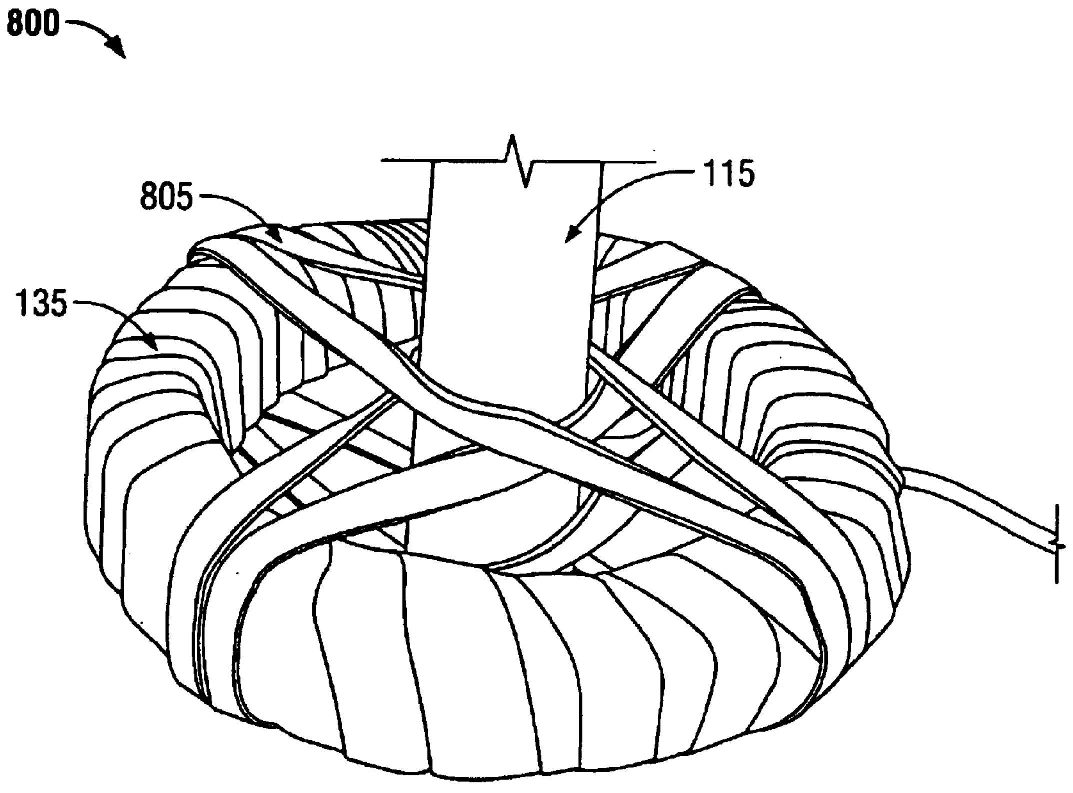
Figure 9:
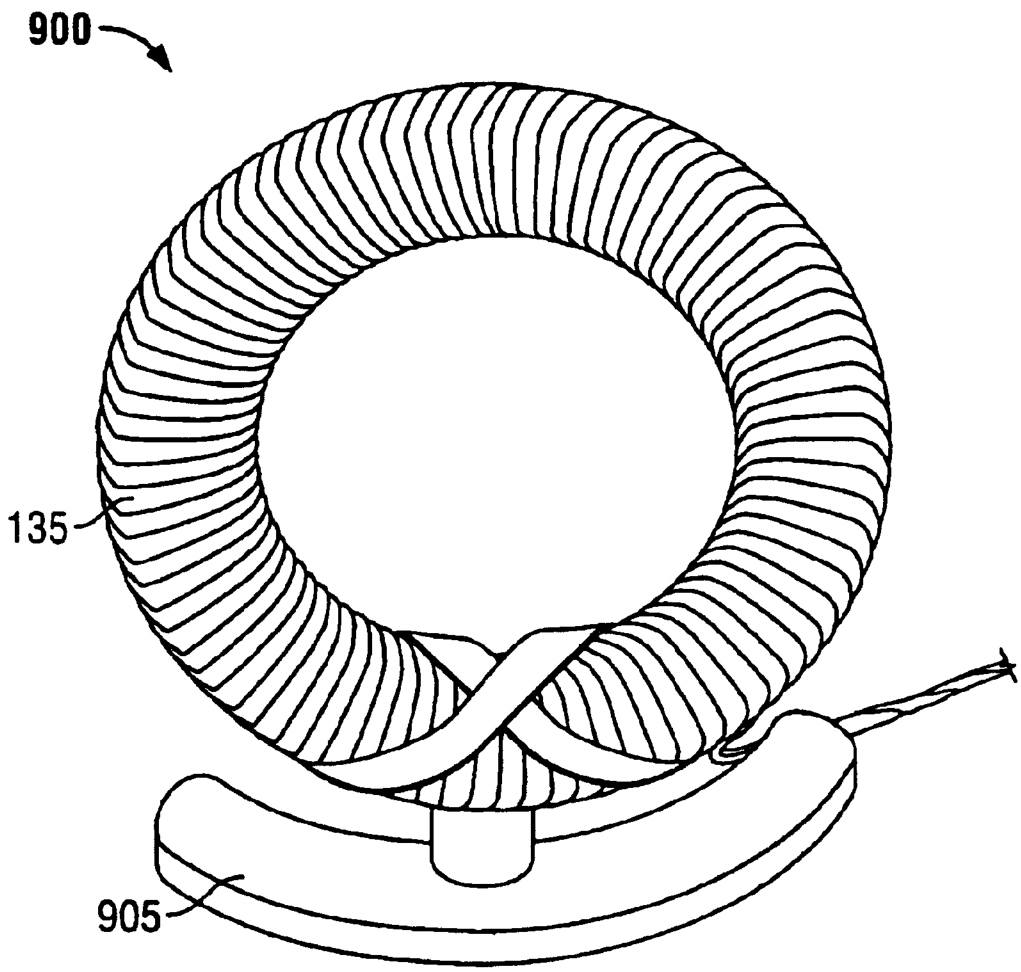

Prior electrical switchgear designs that employ a system of mounting the current sensor to the conductor prior to molding are shown as mounting systems 700, 800, 900 in FIGS. 7–9. However, these other mounting systems 700, 800, and 900 cause dielectric problems between the surface of the current sensor and the conductor. Often, the dielectric failure rate of mounting systems 700, 800, and 900 may be high.

Referring to FIG. 7, in mounting system 700, the current sensor 135 is pre-cast into a molding 705 and is supported directly on the conductor 115 through an opening 710. However, this mounting system 700 may cause dielectric failures subsequent to molding along an interface between the pre-cast sensor and the epoxy material that forms the electrical switchgear housing.

As shown in FIG. 8, in mounting system 800, the current sensor 135 is supported on the conductor 115 using elastic bands 805 such as rubber bands or O-rings. Although mounting system 800 is fast and inexpensive, dielectric failures may occur following casting of the current sensor 135 because the epoxy material shrinks as it cures and leaves small cracks or deformations along the elastic bands 805. One way to address this problem is to ensure that the thermal coefficient of expansion of the elastic bands is close to or matches that of the epoxy.

Referring also to FIG. 9, in mounting system 900, the current sensor 135 is mounted on a stand 905 that is positioned on an inner surface of the current sensor mold. The stand 905 is encapsulated along with the current sensor 135 during molding. When using this approach, care must be taken to ensure that the stand 905 does not move out of place during the molding process, which could cause damage or marring of the mold surface. The material used in the stand 905 must be one capable of withstanding molding temperatures. Again, the presence of a dielectric interface may cause problems.

Referring again to FIGS. 5 and 6, the electrical switchgear 500 includes a current sensor 505 mounted directly to tank 130 by a support element 507, with this mounting being done prior to molding. An expanded mold 600 (FIG. 6) is shaped to include the current interrupter 105, the conductor 115, and the current sensor 505. After molding, a housing 510 encapsulates the current interrupter 105, the conductor 115, the current sensor 505, and the support element 507. As discussed below, this current sensor mounting system eliminates or significantly reduces dielectric interfaces that may cause subsequent failures.

Figure 10:
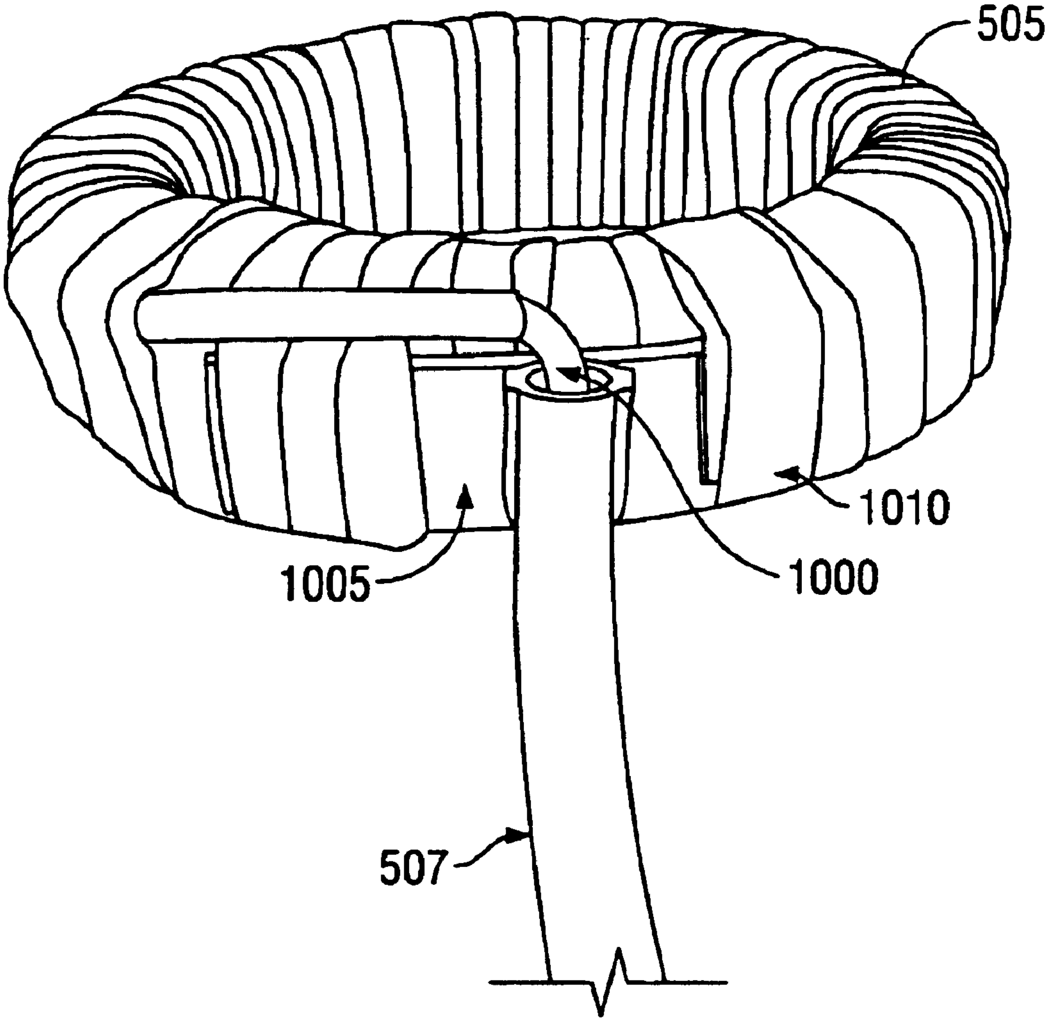
FIGS. 10 and 11 are perspective views of current sensors used in the electrical switchgear of FIGS. 5 and 6.
Figure 11:
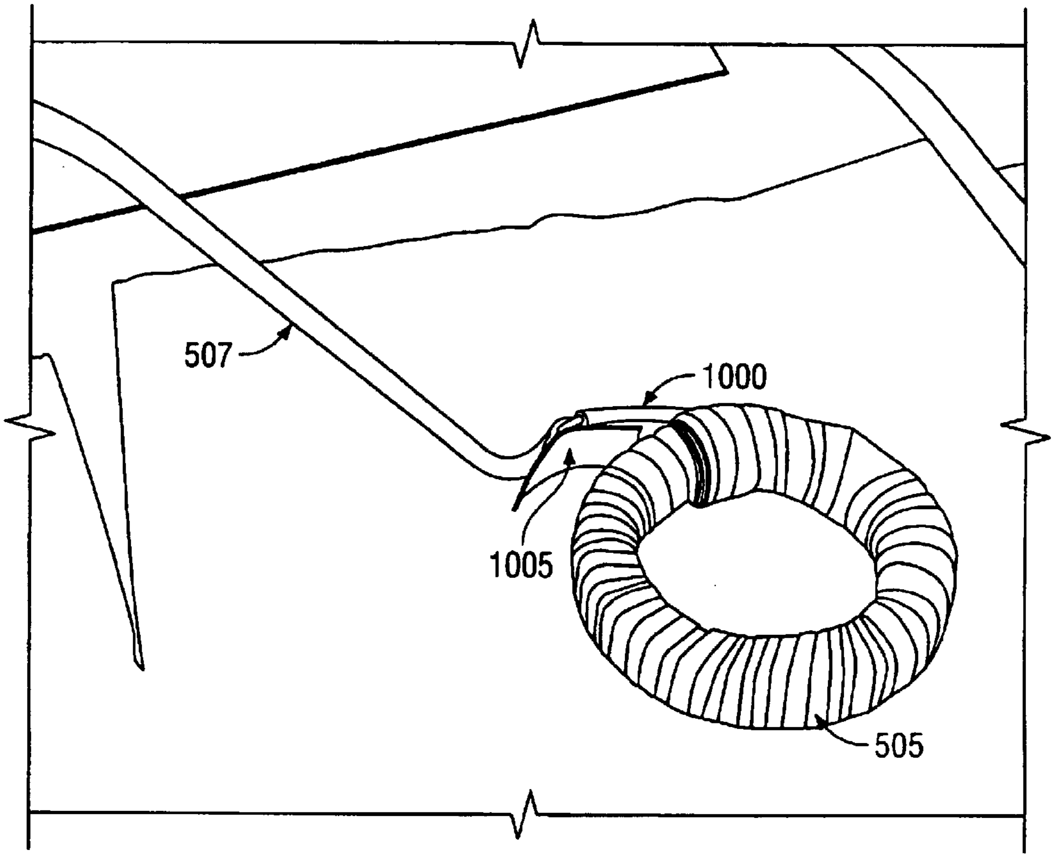

FIGS. 10 and 11 show the current sensor 505 and the support element 507 separate from the housing 510. The support element 507 may include a passage through which conductors 1000 from the current sensor 505 are drawn and connected to appropriate circuitry in the switchgear 500. The current sensor 505 may be painted with a semi-conductive paint or covered with semi-conductive tape to guarantee an intimate ground contact to the epoxy surface surrounding current sensor 505.

In one implementation, the support element 507 may be made of a non-metallic rigid tube. In this case, the tube may be painted with a semi-conductive paint to shield any air that may be within the tube. In another implementation, the support element 507 may be made of a metallic rigid tube, which may be coated with a semi-conductive paint to provide shielding if the epoxy tends to pull away from the tube during subsequent curing or temperature cycling extremes.

To facilitate attachment of the support element 507 to the current sensor 505, a first end of the support element 507 may be bent. A support strip 1005 may be secured to the first end of the support element 507 and formed to match the curvature of the current sensor 505. The support strip 1005 may be metallic or coated, as needed. The support strip 1005 may be secured to the current sensor 505 using any suitable device, such as semi-conductive tape 1010, that shields air that may be trapped between the support strip 1005 and the current sensor 505.

Referring again to FIGS. 5 and 6, the other end of the support element 507 connects with a short post 520 at the bottom of the mold. The short post 520 is hollow, to permit passage of the conductors 1000 from the support element 507 to the switchgear circuitry. The short post 520 and the support element 507 may be sealed where they meet using any suitable material, such as, silicone rubber tubing. Additionally, the conductors 1000 and the support element 507 may be sealed where they meet using, for example, an appropriately sized silicone rubber washer and a coating of room temperature vulcanizing rubber. Epoxy or other materials may be used to seal the support element 507 to short post 520 or the conductors 1000 to the support element 507. In any case, these sealing materials are selected to withstand preheat and molding temperatures that typically reach around 155° C. and to prevent unwanted air flow.

Figure 12:
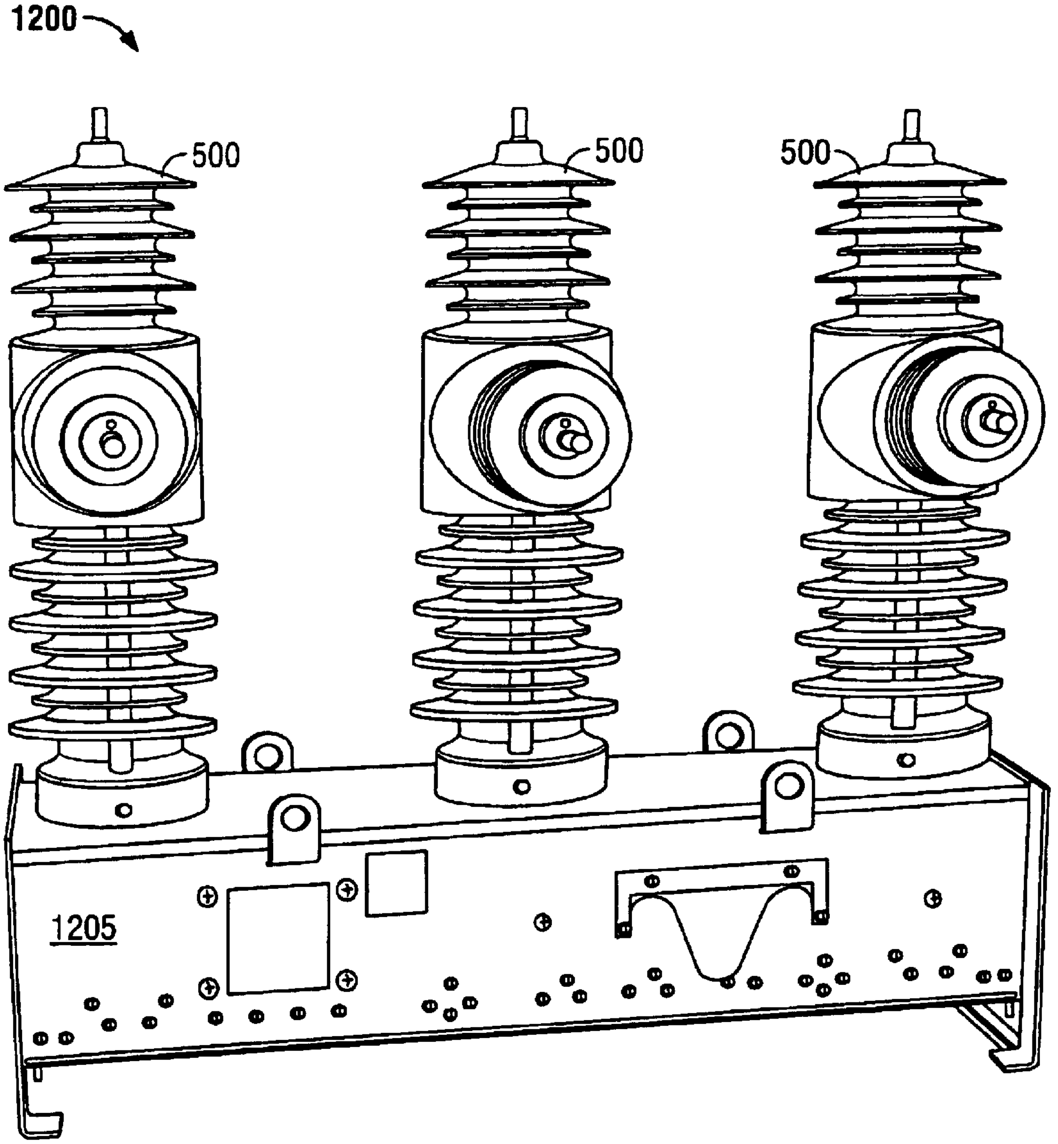
FIG. 12 is a perspective view of a three-phase electrical switchgear that incorporates the electrical switchgear of FIGS. 5 and 6.

Referring to FIG. 12, electrical switchgear 500 may be implemented in a three-phase electrical switchgear system 1200. In this case, electrical switchgear 500 is positioned on each phase of the power system. Electrical switchgear 500 are mounted on a tank 1205 that houses additional components.

Figure 13:
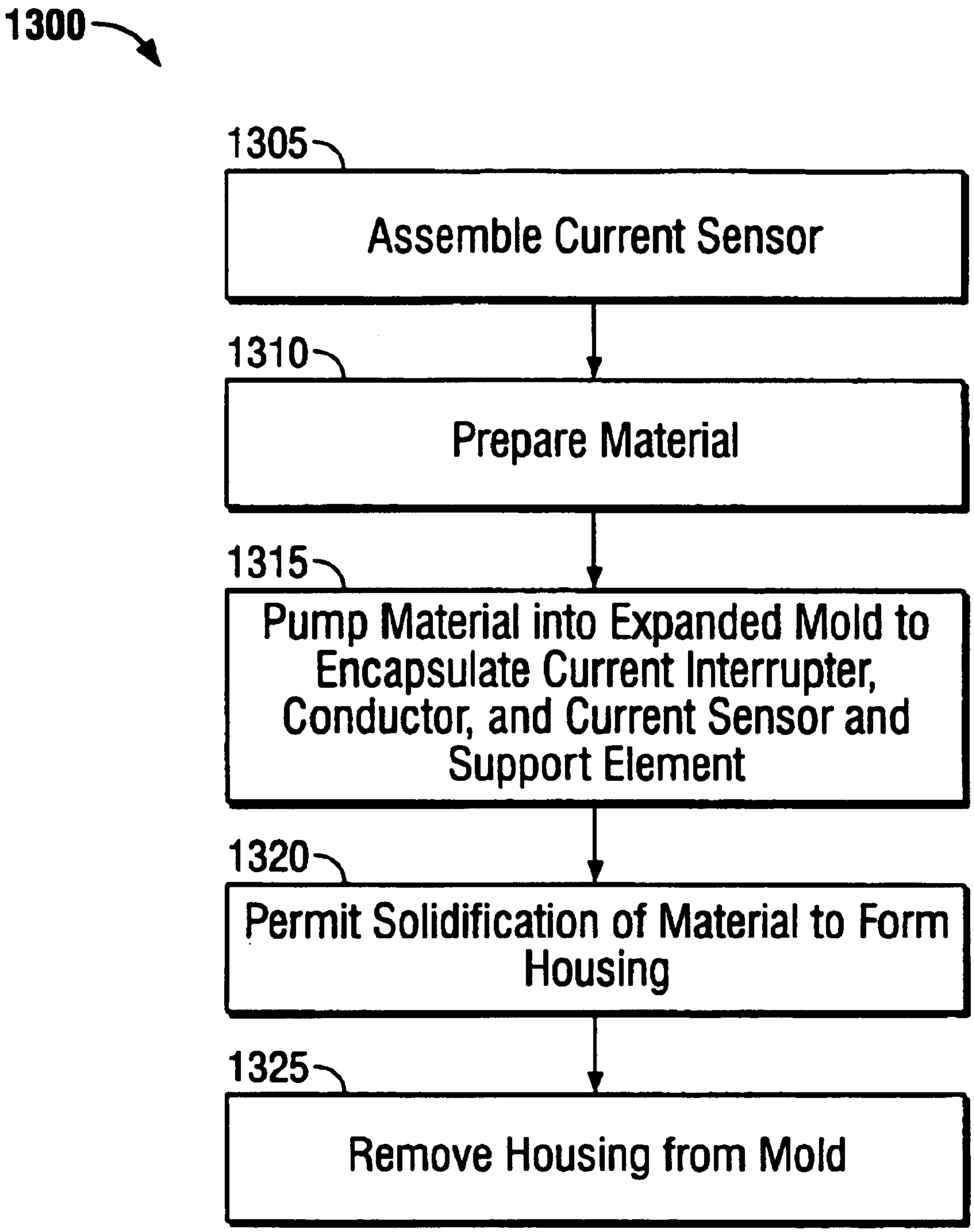
FIG. 13 is a flowchart of a procedure for forming a housing of the electrical switchgear of FIGS. 5 and 6.

Referring also to FIGS. 5 and 13, the housing 510 may be molded. using a procedure 1300 for encapsulating the current interrupter 105, conductor 115, current sensor 505, and support element 507. In one implementation, the procedure 1300 is an automatic pressure gelation (APG) procedure. Initially, the current sensor 505 is assembled in relation to the conductor 115 by securing the support element 507 to the mold 900 (step 1305). In this way, the mold 600 houses the current interrupter 105, conductor 115, current sensor 505, and support element 507. The epoxy material is prepared, for example, by preheating and degassing in special equipment provided with vacuum (step 1310). Then, the prepared material is pumped under pressure into the expanded mold 600 at a higher temperature (step 1315). The higher temperature provides the necessary energy to disrupt the equilibrium of the system to start gelation and crosslinking processes in the material . When the processes are complete, the housing 510 is formed (step 1320) and the formed housing 510 is removed from the expanded mold 600 (step 1325). Alternatively, the housing 510 may be cast by other procedures, for example, vacuum casting.

In any case, the design and mounting of the current sensor 505 and the procedure 1300 for forming the housing 510 reduce or eliminate the dielectric problems between the surface of the current sensor and the conductor. In particular, the current sensor 505 design and mounting eliminates a dielectric interface between the current sensor 505 and the conductor 115. Dielectric failure rates within the housing 510 may be significantly reduced. Moreover, dielectric failure rates approaching 0% are possible with additional modifications to a shielding of the current sensor 505.

The current sensor 505 may be connected to appropriate control or relay circuitry associated with the electrical switchgear at any appropriate time before, during, or after procedure 1300.

A number of embodiments of the invention have been described. Nevertheless, it will be understood that various modifications may be made without departing from the spirit and scope of the invention. Accordingly, other embodiments are within the scope of the following claims. For example, the current sensor support structure of FIGS. 5, 6, and 10–13 may be implemented in any electrical switchgear such as fault interrupters, reclosers, breakers, or switches.

What is claimed is:

1. A method of producing an electrical switchgear device, the method comprising:

securing a support element to a current sensor, mounting the current sensor relative to a main conductor by securing the support element to a surface of a mold that houses a current interrupter and the conductor;

injecting a prepared material into the mold to encapsulate the support element, the current sensor, the conductor, and the current interrupter; and permitting the injected material to solidify to form a housing.

2. The method of claim 1 wherein securing the support element to the current sensor includes drawing sensor conductors from the current sensor through a hollow passage of the support element.

3. The method of claim 1 wherein securing the support element to the current sensor includes bending a first end of the support element and attaching to the first end a support strip shaped to match a curvature of the current sensor.

4. The method of claim 3 wherein securing the support element to the current sensor includes securing the support strip to the current sensor.

5. The method of claim 1 wherein securing the support element to the surface of the mold includes connecting a second end of the support element to a post positioned at the surface of the mold.

6. The method of claim 5 wherein connecting the second end of the support element to the post includes hermetically sealing the second end to the post.

7. The method of claim 5 wherein connecting the second end of the support element to the post includes drawing sensor conductors from the current sensor through a hollow passage of the post.

8. The method of claim 1 further comprising removing the mold from the housing and securing the housing to a tank that houses additional components.

9. The device of claim 1 wherein the housing encapsulates the current sensor, the support element, the current interrupter, and the conductor such that there are no dielectric interfaces between the current sensor and the conductor that could lead to a dielectric failure.

* * * * *